(12) United States Patent
Pecen et al.

(10) Patent No.: US 7,181,223 B1
(45) Date of Patent: Feb. 20, 2007

(54) METHOD FOR RAPID UPLINK ACCESS BY GSM GPRS/EDGE MOBILE STATIONS ENGAGED IN VOICE OVER INTERNET PROTOCOL PACKET TRANSFER MODE

(75) Inventors: Mark Edward Pecen, Rolling Meadows, IL (US); James Earl Womack, Bedford, TX (US)

(73) Assignee: Motorola, Inc., Schaumburg, IL (US)

( * ) Notice: Subject to any disclaimer, the term of this patent is extended or adjusted under 35 U.S.C. 154(b) by 1306 days.

(21) Appl. No.: 09/599,355

(22) Filed: Jun. 21, 2000

(51) Int. Cl.
*H04Q 7/20* (2006.01)

(52) U.S. Cl. .................. 455/452.1; 370/329; 370/335; 455/561

(58) Field of Classification Search ................ 370/465, 370/347, 442, 341, 337, 321, 468, 230, 236, 370/329, 335, 466; 455/426.1, 560, 466, 455/517, 561, 560.1, 562.1, 450, 452.1
See application file for complete search history.

(56) References Cited

U.S. PATENT DOCUMENTS 6,282,182 B1 * 8/2001 Pecen et al. ................ 370/336

(Continued)

OTHER PUBLICATIONS

Draft ETSI EN 300 911 V6.5.0 (1999-07) Title: *Digital Cellular Telecommunications System (Phase 2+) Radio Sybsystem Link Control (GSM 05.08 Version 6.5.0 Release 1997).*

(Continued)

*Primary Examiner*—George Eng
*Assistant Examiner*—Marcos L Torres
(74) *Attorney, Agent, or Firm*—Michael C. Soldner; Lawrence J. Chapa

(57) ABSTRACT

A communication system including a mobile station (202, 322) sending a plurality of uplink radio link control data blocks (328, 332, 336, 340) to a base station (208, 320) in an uplink temporary block flow (248), and receiving a plurality of downlink radio link control data blocks (326, 330, 334, 338, 342) from the base station in a downlink temporary block flow (225). The communication system includes a protocol control unit (214) within the base station, having a base station medium access control layer (213) that sends an identifier during setup of the downlink temporary block flow (224), and sends an uplink state flag indicating channel availability in a first one of the plurality of downlink radio link control data blocks (326). A GPRS/EDGE subsystem (210) is located within the mobile station, having a mobile station medium access control layer (211) that receives the identifier and the uplink state flag, and sends uplink data in a first one of the plurality of uplink radio link control data blocks (32) to the base station in response to the uplink state flag indicating channel availability. The base station medium access control layer sends a directed acknowledgement in a subsequent one of the plurality of downlink radio link control data blocks (330) in response to receipt of the uplink data from the mobile station, and the mobile station sends uplink data in a second one of the plurality of uplink radio link control data blocks (332) in response to the directed acknowledgement.

20 Claims, 7 Drawing Sheets

U.S. PATENT DOCUMENTS

| | | | |
|---|---|---|---|
| 6,310,866 B1 * | 10/2001 | Kronestedt et al. | 370/330 |
| 6,356,759 B1 * | 3/2002 | Mustajarvi | 455/450 |
| 6,396,827 B1 * | 5/2002 | Paivike et al. | 370/347 |
| 6,526,033 B1 * | 2/2003 | Wang et al. | 370/338 |
| 6,529,525 B1 * | 3/2003 | Pecen et al. | 370/469 |
| 6,577,619 B2 * | 6/2003 | Savuoja | 370/349 |
| 6,606,311 B1 * | 8/2003 | Wang et al. | 370/338 |
| 6,625,133 B1 * | 9/2003 | Balachandran et al. | 370/329 |
| 6,631,259 B2 * | 10/2003 | Pecen et al. | 455/426.1 |
| 6,671,511 B1 * | 12/2003 | Forssell et al. | 455/452.1 |

OTHER PUBLICATIONS

Draft ETSI EN 301 349 V6.4.0 (1999-07) Title: *Digital Cellular Telecommunications System (Phase 2+) General Packet Radio Service (GPRS); Mobile Station (MS)-Base Station System (BSS) Interface; Radio Link Control/Medium Access Control (RLC/MAC) Protocol (GSM 04.60 Version 6.4.0 Release 1997)*.

* cited by examiner

METHOD FOR RAPID UPLINK ACCESS BY GSM GPRS/EDGE MOBILE STATIONS ENGAGED IN VOICE OVER INTERNET PROTOCOL PACKET TRANSFER MODE

FIELD OF THE INVENTION

The present invention relates generally to data transmission in a GPRS/EDGE system, and in particular, the present invention relates to set up of an uplink packet data transfer in a GPRS/EDGE system using an indirect carrier sense multiple access with directed acknowledgement.

BACKGROUND OF THE INVENTION

Global System for Mobile Communications (GSM) General Packet Radio Service (GPRS) and Enhanced Data for Global Evolution (EDGE) are intended to allow the service subscriber the ability to send and receive data in an end-to-end packet transfer mode without utilizing network resources in the circuit-switched mode. GPRS and EDGE permit the efficient use of radio and network resources when data transmission characteristics are i) packet based, ii) intermittent and non-periodic, iii) possibly frequent, with small transfers of data, e.g. less than 500 octets, or iv) possibly infrequent, with large transfers of data, e.g. more than several hundred kilobytes. User applications may include Internet browsers, electronic mail and so on.

Efforts are presently underway to further develop the European Telecommunications Standards Institute (ETSI) GPRS and EDGE specifications to support the wireline concept of voice over Internet protocol (VoIP). This effort includes the ability for a mobile station to terminate and originate a VoIP call as an endpoint on the Internet. The current definition for GPRS and EDGE supports the concept of both a packet-switched radio environment and a packet-switched network environment, i.e. the packet abstraction of the Internet is carried through to the air interface in the form of intermittently accessible radio resources based upon the availability of radio resources and the demand for the interchange of user data.

FIG. 1 is a schematic diagram of a complete packet data transfer in a GPRS/EDGE radio environment. As illustrated in FIG. 1, packet switching in the radio environment is achieved using the concept of a packet data transfer 100, referred to as a "temporary block flow" (TBF). The temporary block flow 100, which includes a data transfer setup phase 102, a data transfer phase 104, and a data transfer teardown phase 106, is regarded as the basic unit of data interchange within the GPRS/EDGE environment. As a result, temporary block flow 100 may be thought of conceptually as its three components, data transfer setup phase 102, data transfer phase 104, and data transfer teardown phase 106, occurring sequentially in time. It is understood that the amount of time for the setup of a temporary block flow for GPRS varies, and is dependent on channel conditions, radio resource availability, network congestion and so on.

Although GPRS and EDGE have been specified with the objective of interchanging packet based user data, the application for most such data interchange is not of a real-time nature. Voice over IP presents several challenges to the GPRS/EDGE domain, one of which is the availability of data transfer capability in the uplink direction. For example, when the mobile VoIP user speaks into the phone, a temporary block flow is required to be set up in the uplink direction as soon as possible. However, the time required by GPRS and EDGE to set up such an uplink temporary block flow is prohibitive when compared to the generally accepted maximum turnaround delay for voice telephony, which is 125 ms. Furthermore, VoIP telephony would require the addition of other mechanisms which would enable the radio layers to have knowledge of the type of information they are carrying at any given time.

In particular, the amount of time required for data transfer setup phase 104 has proven to be excessively long, resulting in problems associated with both round-trip turnaround time, and throughput, as a function of the duty-cycle reduction required for setting up an acknowledgement at the upper (network) layers, e.g. the transport layer.

Accordingly, what is needed is a method for enabling a mobile station to more rapidly set up an uplink packet data transfer in a GPRS/EDGE environment.

BRIEF DESCRIPTION OF THE DRAWINGS

The features of the present invention which are believed to be novel are set forth with particularity in the appended claims. The invention, together with further objects and advantages thereof, may best be understood by making reference to the following description, taken in conjunction with the accompanying drawings, in the several figures of which like reference numerals identify like elements, and wherein:

DETAILED DESCRIPTION OF THE PREFERRED EMBODIMENT

The present invention is related for allowing mobile stations to more rapidly set up an uplink packet data transfer in a GPRS/EDGE system using an indirect carrier sense multiple access with directed acknowledgement (ICSMA/DA), whereby the mobile station would be notified of when a transmit resource is not in use, allowing the mobile station to transmit on this resource only if a downlink transfer is in progress and then acknowledging the mobile station's access to the medium directly.

Figure 1:
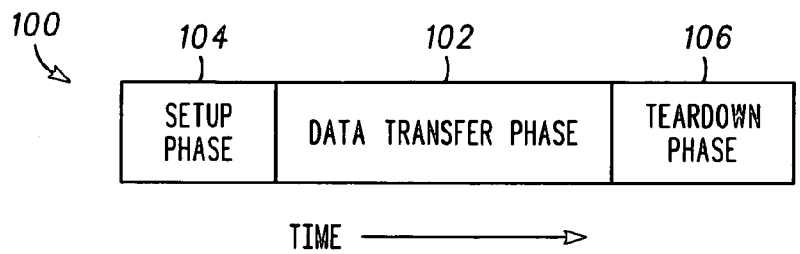
FIG. 1 is a schematic diagram of a complete packet data transfer in a radio environment.
Figure 2:
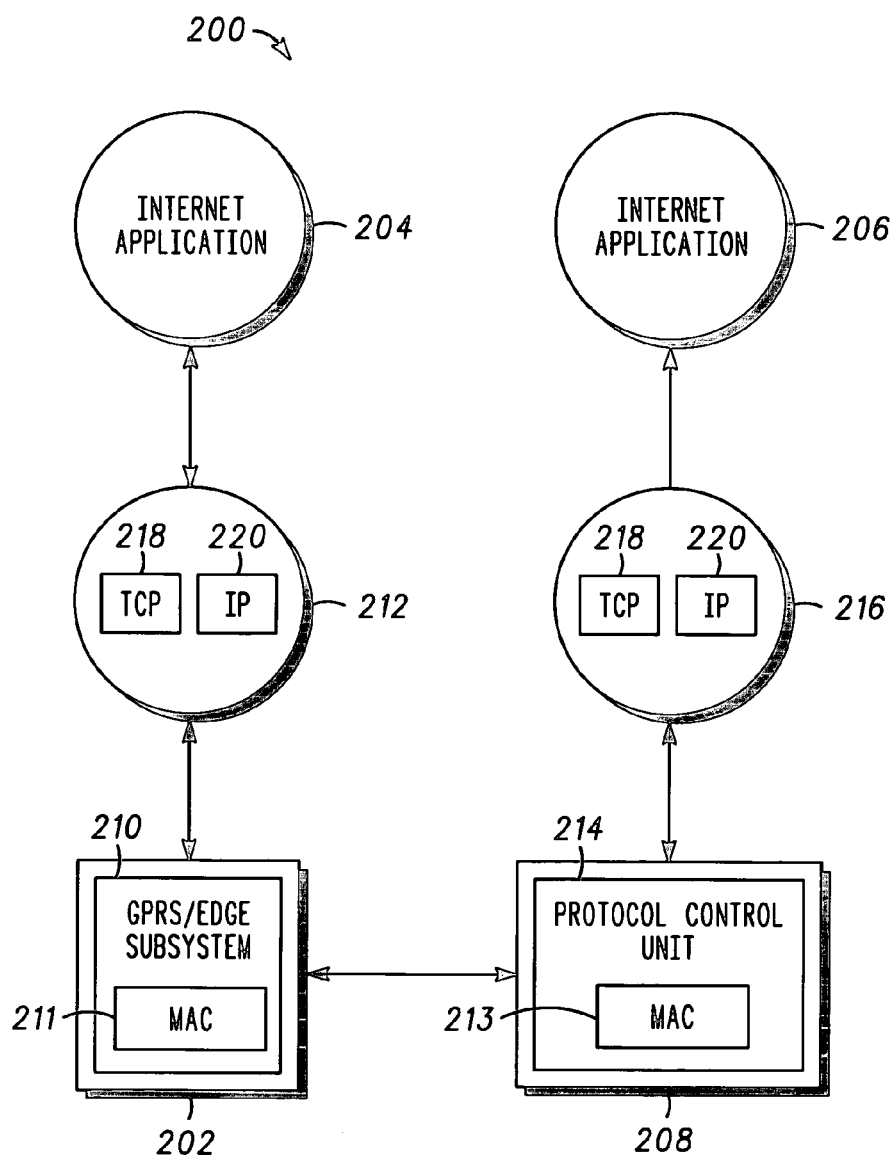
FIG. 2 is a schematic diagram of a GPRS system according to the present invention.

FIG. 2 is a schematic diagram of a GPRS system according to the present invention. As illustrated in FIG. 2, a GPRS system 200 includes a mobile station 202 sending and receiving packet data from an internet application 204 to a remote internet application 206 through a base station system 208. While a single base station system 208 and mobile station 202 is illustrated in FIG. 2, it is understood that GPRS system 200 includes multiple numbers of base station systems and mobile stations. Mobile station 202 includes a GPRS/EDGE subsystem 210 for processing signaling messages received from base station system 208, and signals received from internet application 204 through transport and network layers 212. GPRS/EDGE subsystem 210 includes a medium access control (MAC) layer 211, and adds header overhead for sub-network convergence/divergence protocol (SNDCP), and logical link control (LLC). A protocol control unit 214, includes a medium access control layer 213, and is coupled to or contained within base station system 208, and interfaces with GPRS/EDGE subsystem 210 of mobile station 202, and with internet application 206 through transport and network layers 216. Internet transport layers 212 and 216 include a transmission control protocol (TCP) layer 218 which TCP packetizes stream-oriented user data, and an internet protocol (IP) layer 220 which assigns an address to the packetized data.

Figure 3:
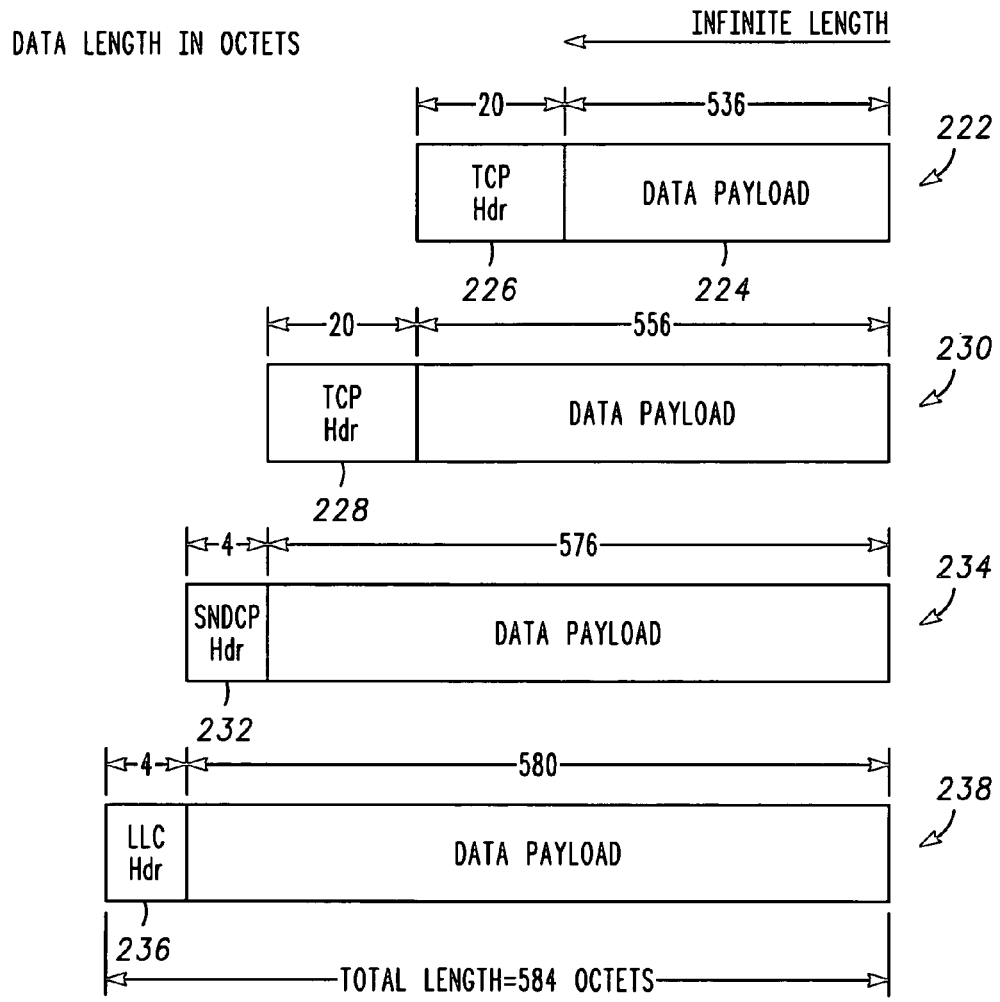
FIG. 3 is a schematic diagram of modification of a user data stream as the user data stream passes through specified layers of a GPRS system.

FIG. 3 is a schematic diagram of modification of a user data stream as the user data stream passes through specified layers of a GPRS system. As illustrated in FIG. 3, a user data stream of infinite length is modified as the user data stream passes through GPRS system 200. For example, as illustrated in FIGS. 2 and 3, as the user data stream passes through transmission control protocol layer 218, and an RLC layer, the data stream is divided into a TCP packet 222 that includes a payload 224 that is 536 octets in length and a transmission control protocol header packet 226 that is twenty octets in length, giving TCP packet 222 a total length of 556 octets. As TCP packet 222 subsequently passes through internet protocol layer 220, an additional twenty octet internet protocol header 228 is appended to TCP packet 222, forming an IP packet 230 having a total length of 576 octets. An additional four octet SNDCP header 232 is appended to IP packet 230, forming an SNDCP packet 234 having a total length of 580 octets, and an additional four octet logical link control header 236 is appended to SNDCP packet 234 forming a logical link control packet 238 having a total length of 584 octets. As a result, the user data stream has a total length of 584 octets as the data stream exits logical link control.

Next, radio link control divides the 584 octet logical link control packet 238 into a certain number of radio link control data blocks, the exact number of which depends upon the channel coding scheme used. For example, in a CS-1 channel coding scheme, the number of radio link control blocks needed is equal to (LLC frame length/RLC payload length)+(LLC frame length MOD RLC payload length), which for the 584 octet logical link control frame is equal to 31 radio link control blocks. In a CS-2 channel coding scheme, the number of radio link control blocks needed is equal to (LLC frame length/RLC payload length)+(LLC frame length MOD RLC payload length), which for the 584 octet logical link control frame is equal to 21 radio link control blocks.

Figure 4:
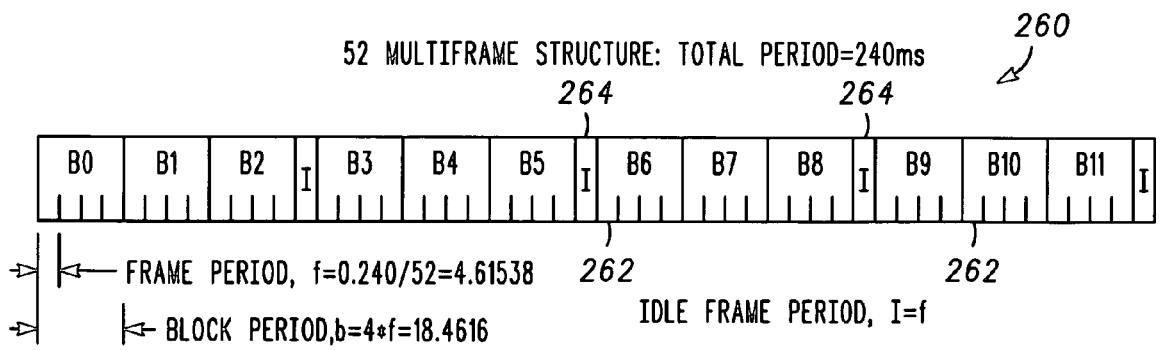
FIG. 4 is a schematic diagram of a multiframe structure for packet data channels.
Figure 5:
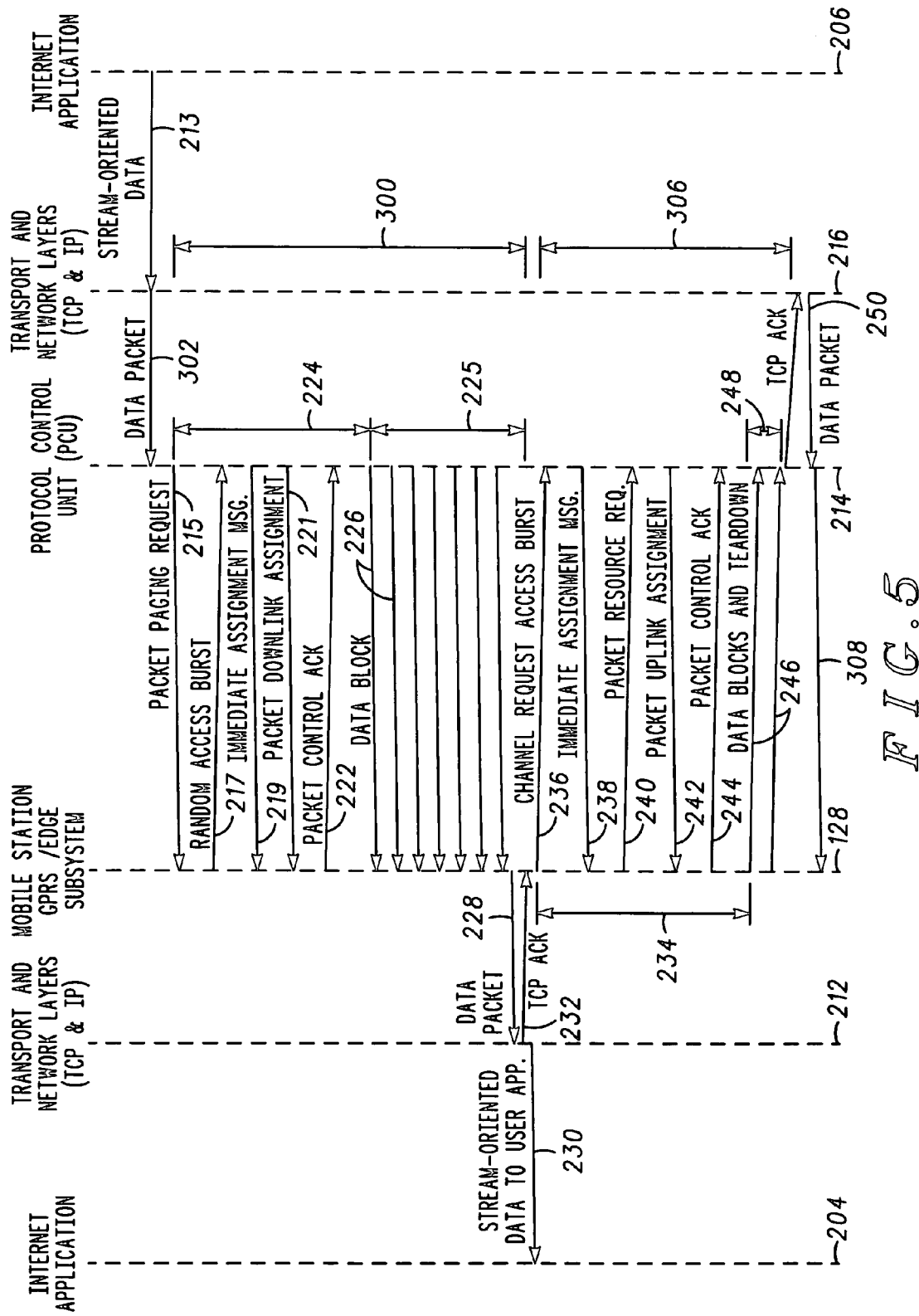
FIG. 5 is a data flow diagram of stream-oriented data transmitted between a mobile station and a network.

FIG. 4 is a schematic diagram of a multiframe structure for packet data channels. Assuming a perfect schedule of one radio link control block transmitted on each available block period for a single timeslot transfer, raw throughput may be computed based upon the length of time required to send a certain number of radio link control data blocks. As illustrated in FIG. 5, a packet data control channel is organized as a multiframe 260 having fifty-two frames 262 and twelve data blocks B0–B11, in which each data block B0–B11 is distributed over four time division multiple access (TDMA) frames. An "idle" or "search" frame 264 located after every three data blocks, enables the mobile station to perform adjacent cell signal measurements, synchronization and verification of synchronization status on adjacent cells, interference measurements, and so forth. Each data block B0–B11 is made up of four frames, each of which has a frame period f equal to 4.61538 milliseconds, and a block period b that is equal to 18.4616 milliseconds, while each idle frame 264 has an idle frame period I that is equal to the frame period f, or 4.61538 milliseconds. The total period of the multiframe 260 structure of the packet data channel is equal to 240 milliseconds.

The length of time required $T_R$ to send a certain number of radio link control data blocks $N_b$ is calculated using the following equation:

$$T_R = (N_b \times b) + ((N_b/3) \times f) \qquad \text{EQUATION 1}$$

while the raw data throughput $R_d$ is calculated using the following equation:

$$R_d = (\text{number of payload octets}/T_R) \times 8 \qquad \text{EQUATION 2}$$

Using Equations 1 and 2, the time required to send all of the radio link control blocks in a logical link control frame in a CS-1 coding scheme (i.e. 31 blocks) is equal to 0.618462 sec. The throughput is the number of payload octets (584) divided by the time required to send them plus their overhead (0.618462) times 8 bits per octet, which is equal to 7000 bits/second. In terms of an overhead analysis of the CS-1 coding scheme, theoretical throughput is approximately equal to 9050 bits/sec. The overhead of scheduling, i.e. the fact that there are idle frames that prevent the scheduling of every consecutive block reduces the effective throughput by 4/52 to approximately 8861 bits/second. The overhead of radio link control headers, i.e. three octets per block, reduces the effective throughput by 3/22 to approximately 7652 bits/second. The overhead of the logical link control header, four octets, reduces the effective throughput by 4/584 to approximately 7599 bits/second. Finally, the overhead of the SNDCP header, 4 octets, reduces the effective throughput by 4/580 to approximately, and the overhead of the Internet protocol suite, i.e. TCP and IP headers, reduces the effective throughput by 40/576 to approximately 7000 bits/second.

Similarly, the time required to send all of the radio link control blocks in a logical link control frame (i.e. 21 blocks) in a CS-2 coding scheme is equal to 0.42 second, and the throughput is the number of payload octets (584) divided by the time required to send them plus their overhead (0.42) times 8 bits per octet, which is equal to 10,209 bits/second. Theoretical throughput on channel at CS-2 is approximately equal to 13,400 bits/sec. The overhead of scheduling, i.e. the fact that there are idle frames that prevent the scheduling of every consecutive block reduces the effective throughput by 4/52 to approximately 12,369 bits/second. The overhead of radio link control headers, i.e. three octets per block, reduces the effective throughput by 3/32 to approximately 11,209 bits/second. The overhead of the logical link control header, four octets, reduces the effective throughput by 4/584 to approximately 11,132 bits/second. Finally, the overhead of the SNDCP header, four octets, reduces the effective throughput by 4/580 to approximately 11,055 bits/second, and the overhead of the Internet protocol suite, i.e. TCP and IP headers, reduces the effective throughput by 40/576 to approximately 10,209 bits/second.

FIG. 5 is a data flow diagram of stream-oriented data transmitted between a mobile station and a network. As illustrated in FIGS. 2 and 5, when stream-oriented data 213 is transmitted from remote internet application 206 to mobile station 202 during a downlink period 300 for sending data long a downlink, the data is first divided into packets at TCP layer 218, and given an address at IP layer 220 of transport and network layer 216, and sent to protocol control unit 214 of base station system 208 as a TCP/IP packet 302.

As illustrated in FIGS. 3 and 5, during downlink period 300, TCP/IP packet 302 includes overhead associated with logical link control packet 238 and SNDCP packet 234, and it is assumed that for every TCP/IP packet 302, there is a corresponding logical link control packet 238 and SNDCP packet 234 as well. The actions associated with transmitting the information over the air interface begin when a logical link control frame containing the user information in the form of an encapsulated transport/network/SNDCP packet enters protocol control unit 214 of base station system 208.

As illustrated in FIGS. 2 and 5, assuming that mobile station 202 is camped on the network in packet idle mode, when appropriate, base station system 208 begins a setup sequence of a downlink setup period 224 by sending a package paging request 215 to GPRS/EDGE subsystem 210 of mobile station 202. In response, after receiving a random access burst 217 from GPRS/EDGE subsystem 210, protocol control unit 214 sends an immediate assignment message 219 and a packet downlink message 221, detailing the parameters of the assignment, e.g. over what channel the transfer would take place, when the transfer would start, and so on. Protocol control unit 214 sends a series of radio link control data blocks 226 to GPRS/EDGE subsystem 210 after receiving a packet control acknowledge message 222 from GPRS/EDGE subsystem 210.

Depending upon the availability of schedulable blocks, packet paging request message 215 may require from 81 to 1721 ms, followed by random access burst 217 from mobile station 102, which typically requires 9.6 ms. Immediate assignment message 219 contains a starting time that may range from 37 ms to 3 minutes in the future, but typically ranges from 13 to 25 TDMA frame periods, or 60–115 ms. Additional signaling associated with exchanging packet downlink assignment message 221 and a packet control acknowledgement message 222 are included in downlink setup period 224. It is therefore assumed that downlink setup period 224 may be equal to a starting time, which is in fact what is observable in an actual system. As a result, the time required for downlink setup period 224 is a minimum of approximately 849 ms, a maximum of approximately 2643 ms and an average of approximately 1746 ms.

After the starting time has been reached, protocol control unit 218 sends GPRS/EDGE subsystem 210 a temporary block flow containing radio link control data blocks 226. Once GPRS/EDGE subsystem 210 has received all downlink blocks, GPRS/EDGE subsystem 210 assembles, processes and transmits a resulting single data packet 228 to IP layer 220 of transport and network layers 212, which then sends data packet 228 to TCP layer 218 of transport and network layers 212.

Assuming perfectly available radio resources so that data may be sent on every schedulable downlink block on a single timeslot, the time to transmit all blocks during data transfer period 225 for a 536 octet user data payload is approximately equal to 0.618462 seconds for a CS-1 coding scheme, and 0.420 seconds for a CS-2 coding scheme. The downlink temporary block flow terminates after a last radio link control data block is sent if sending radio link control on protocol control unit 214 has no more data to be sent and a radio link controller timer T3192 expires before radio link control receives more data to be sent from logical link control, which is the case when a transmission control protocol transmission starts in "congestion control" (slow-start) mode. The temporary block flow is always torn down after the blocks making up the first transmission control protocol packet are transmitted, causing the downlink temporary block flow to incur the overhead of temporary block flow being setup again for the subsequent blocks.

TCP layer 218 of transport and network layers 212 performs redundancy checking and makes a determination that data packet 228 has been received properly. IP layer 220 of transport and network layers 212 then includes the packet data in a stream-oriented output 230 to internet application 204 and issues a TCP acknowledgement (TCP ACK) message 232 to TCP layer 218 of transport and network layers 216 on the far end of the virtual circuit. TCP ACK message 232 is processed by SNDCP/LLC and RLC layers as before, but in an uplink direction.

Radio link controller of GPRS/EDGE subsystem 210 of remote transport and network layers 216 receives a TCP/IP/SNDCP/LLC packet containing TCP ACK message 232, but cannot begin a setup sequence corresponding to an uplink setup period 234 for transmission of TCP ACK message 232 until a radio link control timer T3192 of protocol control unit 114 has expired. As a result, a downlink temporary block flow corresponding to downlink period 300 that carries TCP/IP packet 302 that was initially sent, must be torn down completely before uplink period 234 for setting up TCP ACK message 232 may begin.

For example, upon receiving TCP ACK message 232, GPRS/EDGE subsystem 210 sends a channel request access burst 236 to protocol control unit 214, which responds by sending an immediate assignment message 238. GPRS/EDGE subsystem 210 then sends a packet resource request message 240 to protocol control unit 214 requesting resources for a temporary block flow. Protocol control unit 214 responds with a packet uplink assignment message 242, which is acknowledged by GPRS/EDGE subsystem 210 in a packet control acknowledge message 244. Data blocks 246 containing TCP ACK message 232 and teardown are then transmitted from GPRS/EDGE subsystem 210 to protocol control unit 214 during an acknowledge data transfer period 248. Protocol control unit 214 then transmits data blocks 246 to transport and network layers 216 in a TCP acknowledge message 304. As a result, uplink setup period 234 and acknowledge data transfer period 248 form an uplink period 306 that is required for TCP acknowledge message 232 to reach transport and network layer 216 in corresponding TCP acknowledge message 304. Once the required TCP ACK message is received by transport and network layers 216, a next TCP/IP data packet message 250 is sent from transport and network layers 216 to GPRS/EDGE subsystem 210 via protocol control unit 214.

The period required for the initial setup of uplink setup period 234 is dependent upon components such as the periodic occurrence of a random access channel (RACH), the starting time sent in immediate assignment message 238, and the starting time sent in packet uplink assignment message 242. The periodic occurrence of a random access channel can range from 41–217 TDMA frame periods, assuming a case of 41 frame periods, or 190 ms. The starting time sent in immediate assignment message 238 may range from 9 TDMA frame periods to 3 minutes, but is typically from 9–25 TDMA frame periods, or 42–115 ms, while the starting time sent in packet uplink assignment message 242 may range from 9 TDMA frame periods to 3 minutes, but is typically around 20 TDMA periods, or 92 ms. As a result, initial setup of uplink setup period 234 is typically a minimum of approximately 320 ms, a maximum of approximately 480 ms, and an average of approximately 320 ms. This exceeds the generally accepted maximum end to end delay of 125 milliseconds.

TCP ACK message 232 has a length of 40 octets, which combined with the overhead of both logical link control header 236 and SNDCP header 232 is equal to 48 octets. Assuming perfectly available radio resources so that data may be sent on every schedulable downlink block on a single timeslot, the time to transmit all data blocks 246 during acknowledge data transfer period 248 for a 40 octet TCP/IP ACK payload is equal to 60 ms (3 RLC data blocks) for the CS-1 coding scheme, and 37 ms (2 RLC data blocks) for the CS-2 coding scheme.

Figure 6:
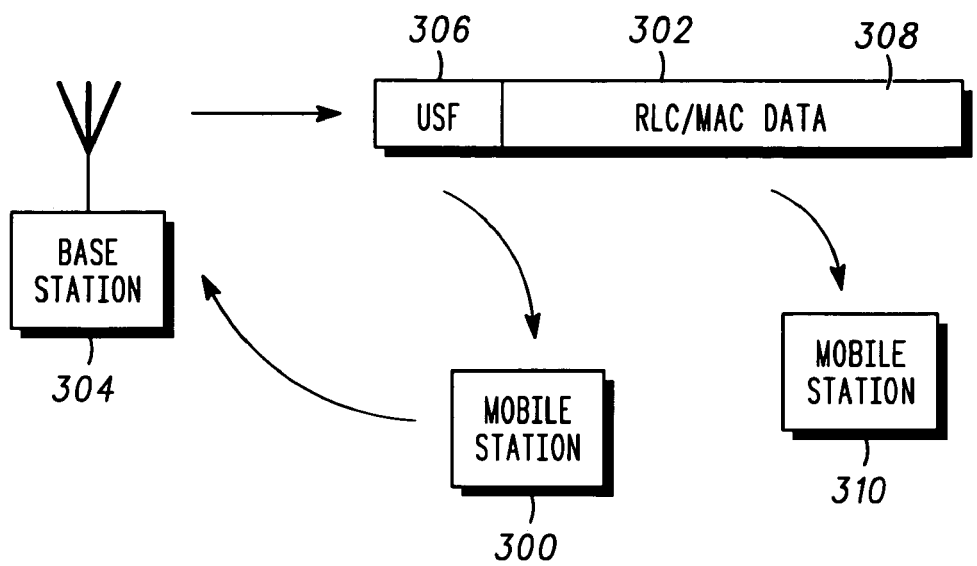
FIG. 6 is a schematic diagram of a dynamic timeslot allocation for medium access control.

Mobile station 202 receives the right to transmit on the uplink by using either a dynamic timeslot allocation medium control access (MAC) mode or a fixed timeslot allocation medium control access mode. FIG. 6 is a schematic diagram of a dynamic timeslot allocation for medium access control. As illustrated in FIG. 6, in dynamic timeslot allocation, a mobile station 300 receives a downlink radio link control/medium access control (RLC/MAC) control block 302 from a base station 304 that includes a special address, referred to as an uplink state flag (USF) 306, along with RLC/MAC data 308. If USF 306 (a 3-bit quantity) is identical to that of a USF assigned to mobile station 300, then mobile station 300 has the right to transmit in the next time division multiple access (TDMA) frame. A data block addressed to a second mobile station 310 may contain USF information for mobile station 300.

Figure 7:
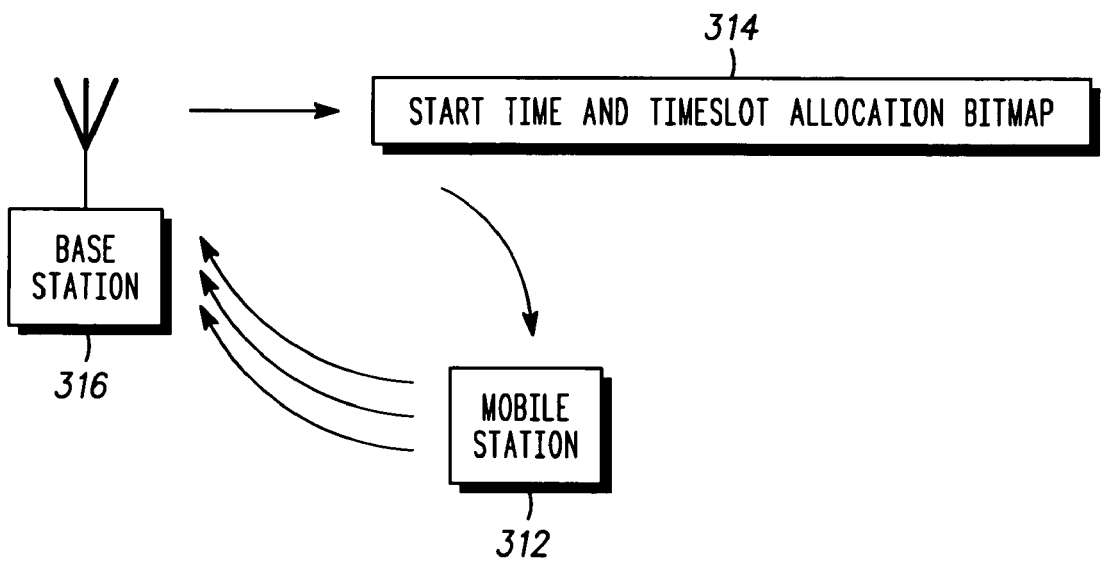
FIG. 7 is a schematic diagram of a fixed timeslot allocation for medium access control.

FIG. 7 is a schematic diagram of a fixed timeslot allocation for medium access control. As illustrated in FIG. 7, in fixed timeslot allocation, a mobile station 312 periodically receives a starting time and a bit-map 314 from a base station 316, representing a base and offset of future timeslots on which the mobile station is to transmit. In this way, mobile station 312 is informed of when temporary block flow starts and receives bitmap 314 representing timeslots on which mobile station 312 is to transmit relative to the starting time, so that mobile station 312 transmits in timeslots assigned by the starting time and allocation bit-map.

The present invention utilizes a USF field for both fixed and dynamic allocation MAC mode, when the mobile station is not engaged in an uplink temporary block flow, although USF value is given a different meaning, as described below. The present invention includes a collision avoidance (CA) mechanism that utilizes the already-present USF address in the RLC/MAC control block to enable the rapid creation of an uplink temporary block flow, when there is already a downlink temporary block flow in progress. Since the USF value is receivable by multiple mobile stations on the radio resource, the USF value assignment serves as an indirect lock on the resource.

Figure 8:
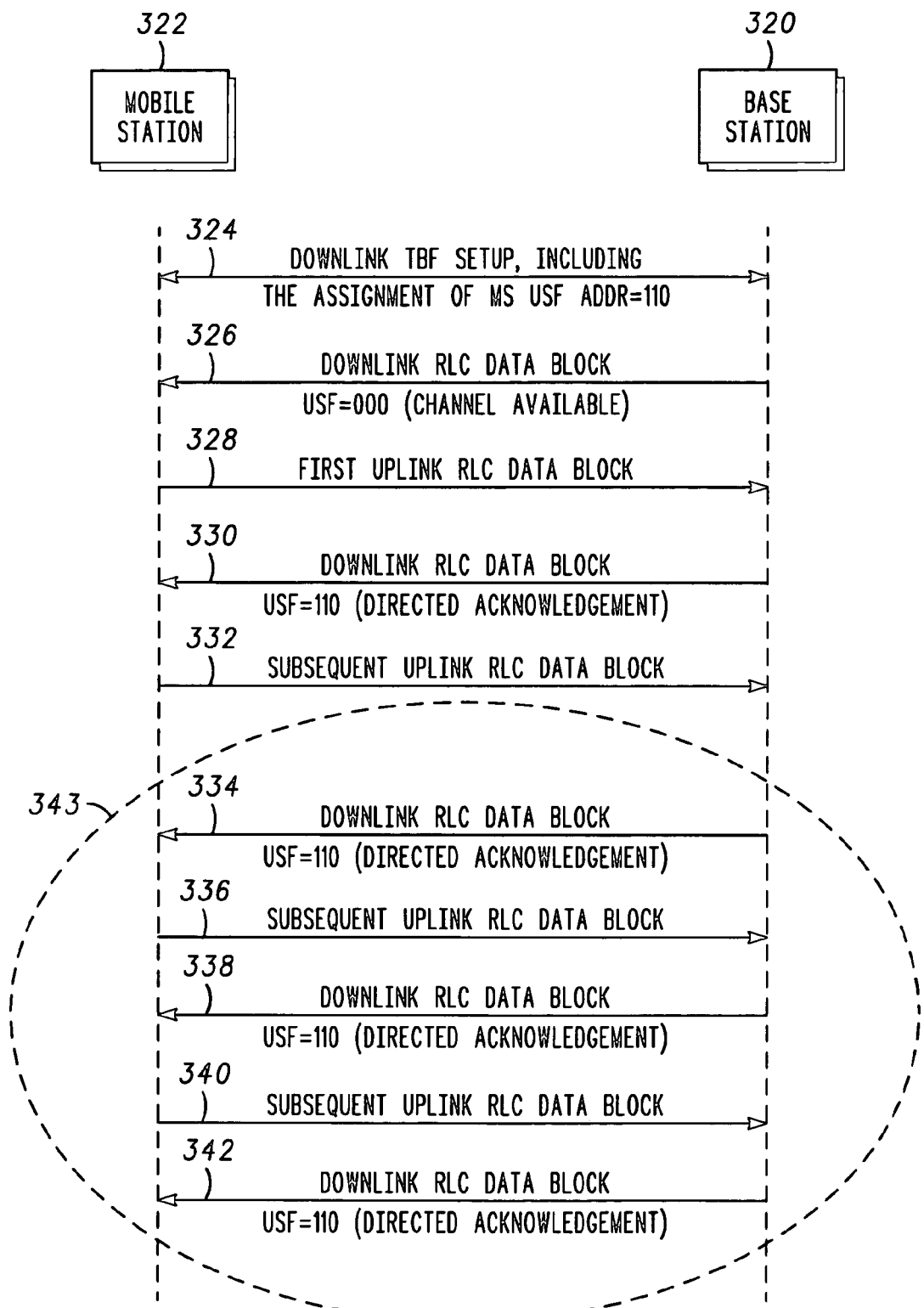
FIG. 8 is a schematic diagram of signaling logic for establishing an uplink packet data transfer.

According to the present invention, the USF field is recognized during an active downlink temporary block flow as a "channel availability" indicator and a "directed acknowledgement field". FIG. 8 is a schematic diagram of signaling logic for establishing an uplink packet data transfer according to the present invention. According to the present invention, the mobile station, when receiving blocks comprising a downlink temporary block flow, examines the USF field when it has information to transmit in an uplink temporary block flow. If the USF were a zero value, then the channel would be evaluated as "available", and the mobile station may therefore begin transmitting its new uplink TBF information.

In particular, as illustrated in FIGS. 5 and 8, while a base station 320 and a mobile station 322 are in a downlink temporary block flow setup 324 of downlink setup period 224, which includes the assignment of a mobile station USF address, such as "110", for example, base station 320, through medium access control layer 213, sends a USF address to mobile station 322 by which mobile station 322 will be identified for the duration of the downlink temporary block flow for data transfer period 225 resulting from downlink temporary block flow setup 324, along with a contingent uplink timeslot number on which mobile station 322 may transmit. Once GPRS/EDGE data flows in the downlink direction in data transfer period 225, base station 320, through medium access layer 213, indicates uplink channel availability 326 to mobile station 322 by sending the value USF=000. If mobile station 322 has data to transmit on the uplink, mobile station 322 transmits a first uplink radio link control data block 328 on the timeslot indicated by base station 320 as a contingent uplink timeslot number.

Base station 320 receives the first uplink data block 328 and knows how to associate a temporary flow identifier (TFI) to a USF value of mobile station 322. Base station 320 acknowledges the USF address of mobile station 322 in the next downlink radio link control data block 330 by inserting the USF value (that serves to indirectly address a mobile station) of mobile station 322 into the header of next downlink radio link control data block 330. According to the present invention, the inserted USF value serves as an acknowledgement to the sending mobile station 322 and as a "channel busy" indication to other mobiles desiring to transmit. Mobile station 322, through medium access layer 211, interprets next downlink radio link control data block 330 with a USF value located in a header at the beginning of radio link control data block 330 as an acknowledgement that the first uplink data block 328 was correctly received by base station 320, and sends a subsequent uplink radio link control block 332. This procedure is then continued for the remaining portion 343 of the uplink temporary block flow 248, until the end of uplink temporary block flow 248, which is indicated in the usual manner to base station 320 by the countdown procedure in the last several radio link control data blocks. In the countdown procedure, mobile station 322, during transmission of the last few data blocks 246, decrements a variable in the header of data blocks 246 to inform base station 320 that the uplink data block flow is about to end. This knowledge helps base station 320 allocate to another mobile station.

As a result, according to the present invention, mobile station 322, when receiving blocks comprising a downlink temporary block flow, would examine the USF field when mobile station 322 has information to transmit in an uplink temporary block flow. If the USF is a zero value, then the channel would be evaluated by mobile station 322 as being "available", and mobile station 322 may therefore begin transmitting new uplink temporary block flow information. Base station 320 acknowledges receipt of the uplink data blocks 328, 332, 336, 340 and so forth, by sending a direct acknowledgement in respective downlink radio link control blocks 330, 334, 338, 342 and so forth. Unlike a true "random access" method, the present invention utilizes the packet data traffic channel (PDTCH), rather than a random access channel, since the synchronization between mobile station 322 and base station 320 is already known. There is therefore no need for the special shortened GSM "access burst" to be used. As a result, an initial radio link control block data block (and therefore user information) may be sent along with the uplink access procedure, further streamlining uplink access. The generally used GSM uplink access method is shown in FIG. 5 and includes exchange of channel request access burst 236, immediate assignment message 238, packet resource request 240, and packet uplink assignment 242. In this way, the present invention removes the need for this interchange.

Figure 9:
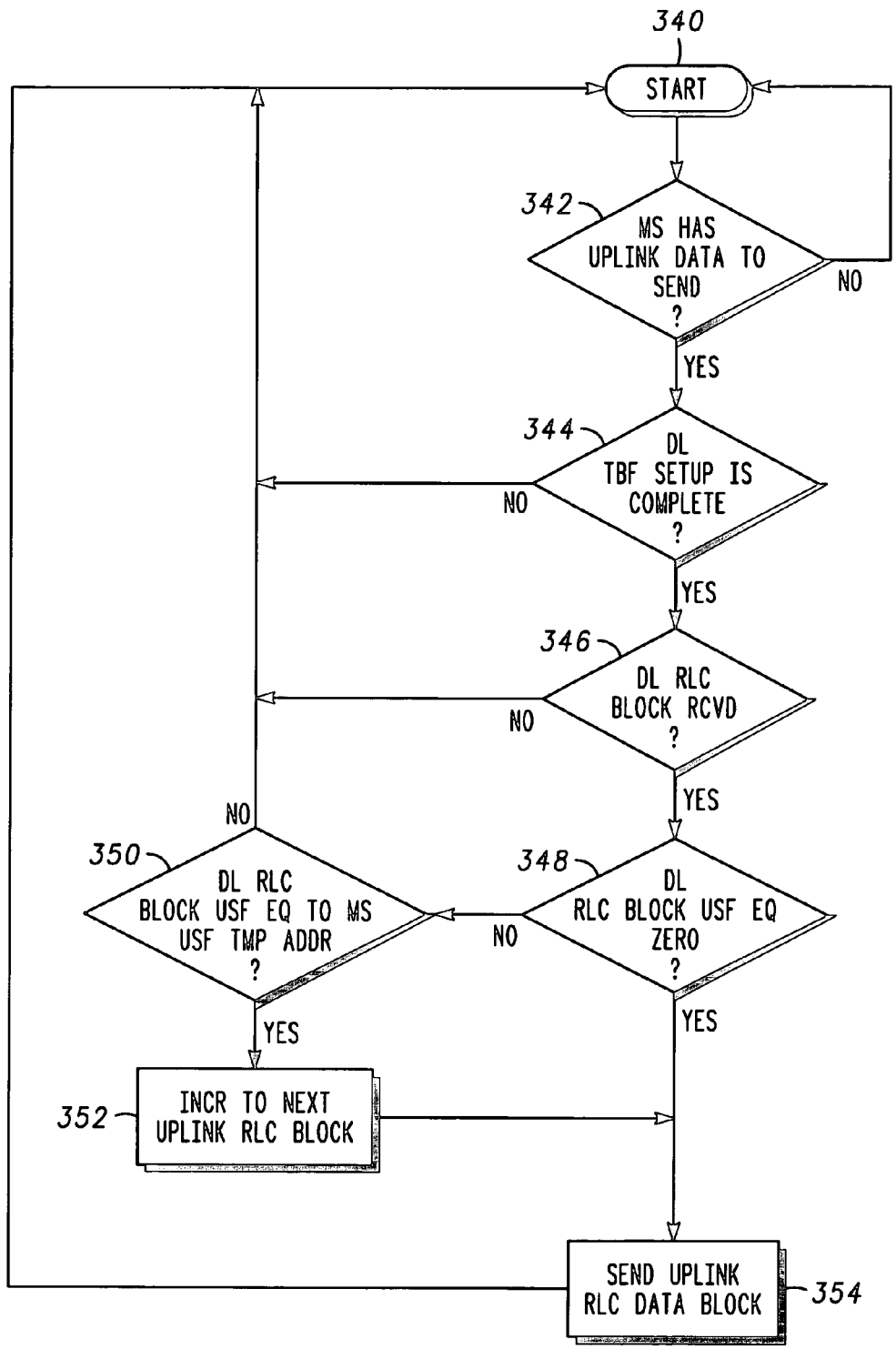
FIG. 9 is a flowchart of indirect carrier sense multiple access with directed acknowledgement in a mobile station.

FIG. 9 is a flowchart of indirect carrier sense multiple access with directed acknowledgement in a mobile station, according to the present invention. As illustrated in FIGS. 8 and 9, upon completion of downlink temporary block flow setup 324, mobile station 322 determines whether mobile station 322 has data available to transmit on the uplink, Step 342. Once mobile station 322 has data to transmit on the uplink, mobile station 322 then determines whether downlink temporary block flow setup 324 has been completed, Step 344. If downlink temporary block flow setup 324 has not been completed, mobile station 322 waits, Step 340, until downlink temporary block flow setup 324 is completed.

If downlink temporary block flow is complete in Step 344, mobile station 322 determines whether downlink radio link control block 326 has been received, Step 346. If downlink radio link control block 326 has not been received, the process returns to Step 340 so that mobile station 322 waits until downlink radio link control block 326 is received. If downlink radio link control block 326 has been received, mobile station 322 determines whether USF contained within downlink radio link control block 326 is equal to zero, Step 348, which indicates that base station 320 has indicated to mobile station that an uplink channel is available and is not being utilized by any mobile station. If uplink channel is available, i.e., USF contained within downlink radio link control block 326 is equal to zero in Step 348, mobile station 322 sends first uplink radio link control block 328 to base station using uplink channel, Step 354. Once mobile station 322 sends uplink radio link control block 328 to base station 320 in Step 354, the process returns to Step 340, and the process continues for the next uplink radio link control block.

If uplink channel is not available, i.e., USF contained within downlink radio link control block 326 is not equal to zero in Step 348, mobile station 322 determines whether USF of downlink radio link control block is equal to identifier of mobile station 322, which indicates that mobile station 322 can transfer the next data block.

Figure 10:
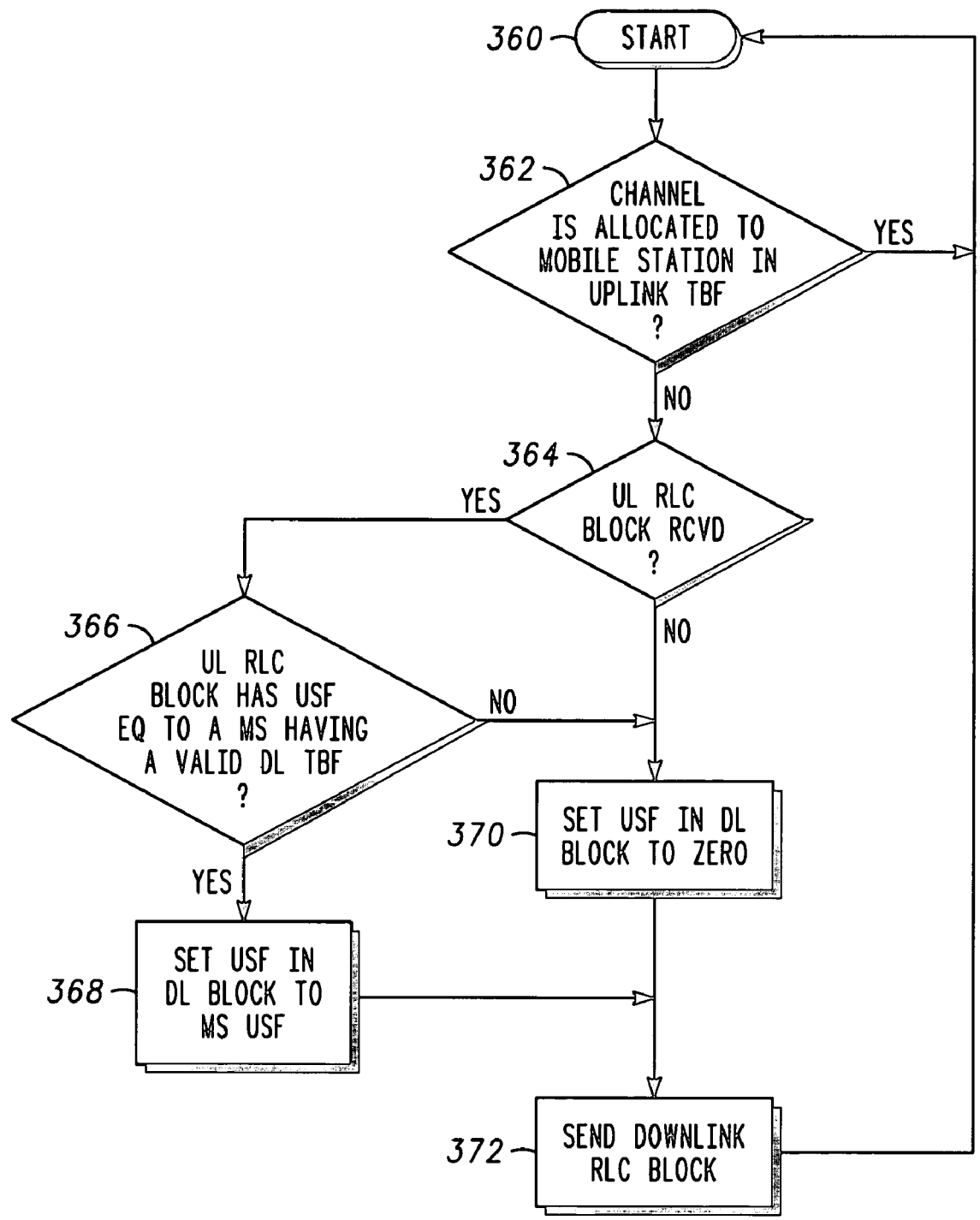
FIG. 10 is a flowchart of indirect carrier sense multiple access with directed acknowledgement in a base station

FIG. 10 is a flowchart of indirect carrier sense multiple access with directed acknowledgement in a base station, according to the present invention. As illustrated in FIG. 10, during a downlink temporary block flow setup period, base station 320 determines whether a channel is allocated to mobile station 322 in an uplink temporary block flow, Step 362. If a channel has already been allocated, the process returns to the start, Step 360. If a channel has not been allocated, base station 320 determines whether uplink radio link control block 328 has been received from mobile station 322, Step 364. If uplink radio link control block 328 has not been received, base station 320 sets the USF in downlink radio link control block 326 equal to zero, Step 370, and sends downlink radio link control block 326, Step 372. The process then returns to Step 360 so that base station 320 continues to send an indication of uplink channel availability to mobile station 322 in subsequent downlink radio control blocks until base station 320 receives the initial uplink radio link control data block on the timeslot allocated by base station 320 as a contingent uplink timeslot number.

If base station 320 determines in Step 364 that uplink radio link control block 328 has been received, base station 320 then makes a determination as to whether uplink radio link control block 328 has a USF value equal to a mobile station having a valid downlink temporary block flow, Step 366. If uplink radio link control block 328 does not have a USF value equal to a mobile station having a valid downlink temporary block flow, the process returns to Step 370, so that base station 320 continues to send an indication of uplink channel availability to mobile station 322 in subsequent downlink radio control blocks until base station 320 receives the next uplink radio link control data block on the timeslot allocated by base station 320 as a contingent uplink timeslot number. However, if uplink radio link control block 328 does have a USF value equal to a mobile station having a valid downlink temporary block flow in Step 366, base station 320 sets the USF value in the downlink radio link control data block 330 to the value of USF in mobile station 322. In the example shown in FIG. 8, the USF value in mobile station 322 is "110" as indicated in downlink temporary block flow setup 324. Base station then sends downlink radio link control data block 330 with USF equal to "110" as a directed acknowledgement of the USF of mobile station 322. The process then returns to Step 360 so that base station 320 waits for receipt of subsequent uplink radio link control data block 322 in Step 364, and the process continues until the end of the associated uplink temporary block flow indicated by the countdown procedure in the last several radio link control data blocks of the uplink data transfer by mobile station 322, or until mobile station 322 no longer has data to transmit.

While a particular embodiment of the present invention has been shown and described, modifications may be made. It is therefore intended in the appended claims to cover all such changes and modifications which fall within the true spirit and scope of the invention.

What is claimed is:

1. A communication system including a mobile station sending a plurality of uplink radio link control data blocks to a base station in an uplink temporary block flow, and receiving a plurality of downlink radio link control data blocks from the base station in a downlink temporary block flow, comprising:
   a protocol control unit within the base station, having a base station medium access control layer sending an identifier during setup of the downlink temporary block flow, and sending an uplink state flag indicating channel availability, which is not specific to a particular mobile station, in a first one of the plurality of downlink radio link control data blocks; and
   a GPRS/EDGE subsystem within the mobile station, having a mobile station medium access control layer receiving the identifier and the uplink state flag, and sending uplink data in a first one of the plurality of uplink radio link control data blocks to the base station in response to the uplink state flag indicating channel availability, wherein the base station medium access control layer sends a directed acknowledgement in a subsequent one of the plurality of downlink radio link control data blocks in response to receipt of the uplink data from the mobile station, and the mobile station sends uplink data in a second one of the plurality of uplink radio link control data blocks in response to the directed acknowledgement.

2. A communication system including a first station sending a plurality of uplink data blocks to a second station in an uplink temporary block flow, and receiving a plurality of downlink data blocks from the second station in a downlink temporary block flow, comprising:

a protocol control unit within the second station, having a medium access control layer, which sends an identifier during setup of the downlink temporary block flow, and sends an uplink state flag indicating channel availability, which is not specific to a particular station including either the first station or the second station, in a first one of the plurality of downlink data blocks, and a packet data subsystem within the first station, having a medium access control layer, which receives the identifier and the uplink state flag, and sends uplink data in a first one of the plurality of uplink data blocks to the second station in response to the uplink state flag indicating channel availability, wherein the medium access control layer of the second station sends a directed acknowledgement in a subsequent one of the plurality of downlink data blocks in response to receipt of the uplink data from the first station, and the first station sends uplink data in a second one of the plurality of uplink data blocks in response to the directed acknowledgement.

3. A communication system in accordance with claim 2 wherein the first station is a mobile station and the second station is a base station in a radio communication system.

4. A communication system in accordance with claim 3 wherein the radio communication system includes a Global System for Mobile (GSM) communication system with General Packet Radio Service (GPRS) and Enhanced Data for Global Evolution (EDGE).

5. A communication system in accordance with claim 2 wherein the downlink data blocks include downlink radio link control data blocks, and the uplink data blocks include uplink radio link control data blocks.

6. A communication system in accordance with claim 2 wherein at least some of the downlink data blocks and the uplink data blocks include packetized voice data.

7. A method for rapid uplink access of a communication system including a first station and a second station, the method in a first station comprising:

determining if the first station has uplink data to send;

if the first station has uplink data to send, then determining if a downlink temporary block flow setup has been established;

if the downlink temporary block flow setup has been established, then receiving a downlink data block including an uplink state flag;

comparing the value of the uplink state flag to a value indicative that the uplink channel is available, and if the uplink state flag has a value indicative that the uplink channel is available, without being specific to a particular station, then sending an uplink data block from the first station to the second station;

receiving a subsequent downlink data block including an uplink state flag; and comparing the value of the uplink state flag of the subsequent downlink data block to a value corresponding to an address assigned to the first station, and if the value of the uplink flag corresponds to the address assigned to the first station, then sending a subsequent uplink data block from the first station to the second station.

8. A method in accordance with claim 7 wherein if the value of the uplink state flag corresponds to the address assigned to the first station, when comparing the value of the uplink state flag, then incrementing to the next uplink data block to be transmitted in the first station as part of sending an uplink data block.

9. A method in accordance with claim 7 wherein the uplink data blocks and the downlink data blocks are received via a radio link.

10. A method in accordance with claim 7 wherein the uplink data blocks include uplink radio link control data blocks and the downlink data blocks include downlink radio link control data blocks.

11. A method in accordance with claim 7 wherein a value of zero for the uplink state flag is indicative that the uplink channel is available.

12. A method in accordance with claim 7 wherein the first station is a mobile station and the second station is a base station in a radio communication system.

13. A method in accordance with claim 12 wherein the radio communication system includes a Global System for Mobile (GSM) communication system with General Packet Radio Service (GPRS) and Enhanced Data for Global Evolution (EDGE).

14. A communication system in accordance with claim 7 wherein at least some of the downlink data blocks and the uplink data blocks include packetized voice data.

15. A method for rapid uplink access of a communication system including a first station and a second station, the method in the second station comprising:

determining if a channel has already been allocated to the first station in an uplink temporary block flow;

if the channel has not already been allocated, then determining if an uplink data block has been received from the first station;

if the uplink data block has been received, then determining if an uplink state flag of the uplink data block has a value corresponding to a valid downlink temporary block flow;

if the uplink data block has not been received or if the uplink state flag of the received uplink data block does not have a value corresponding to the valid downlink temporary block flow, then setting an uplink state flag in a downlink data block to a value indicative that the uplink channel is available, without being specific to a particular station, otherwise the uplink state flag in the downlink data block is set to the value of the uplink state flag of the uplink data block received from the first station; and sending the downlink data block.

16. A method in accordance with claim 15 wherein the uplink data blocks and the downlink data blocks are received via a radio link.

17. A method in accordance with claim 15 wherein the uplink data blocks include uplink radio link control data blocks and the downlink data blocks include downlink radio link control data blocks.

18. A method in accordance with claim 15 wherein the value of the uplink state flag is set to a value of zero, to indicate that the uplink channel is available.

19. A method in accordance with claim 15 wherein the first station is a mobile station and the second station is a base station in a radio communication system.

20. A method in accordance with claim 19 wherein the radio communication system includes a Global System for Mobile (GSM) communication system with General Packet Radio Service (GPRS) and Enhanced Data for Global Evolution (EDGE).

* * * * *